United States Patent [19]
Mills et al.

[11] Patent Number: 5,337,885
[45] Date of Patent: Aug. 16, 1994

[54] ALIGNMENT MONITOR AND METHOD

[75] Inventors: Robert L. Mills, Chalfont; John C. Lodholz, Doylestown, both of Pa.; Rangasami Sarat-Chandra, Pleasanton, Calif.; Franklin P. Orlando, Morgan Hill, Calif.; Donald J. Christian, Fremont, Calif.

[73] Assignee: FMC Corporation, Chicago, Ill.

[21] Appl. No.: 41,437

[22] Filed: Mar. 31, 1993

[51] Int. Cl.⁵ ............................................. B65G 43/00
[52] U.S. Cl. .................. 198/502.4; 198/502.1; 198/718
[58] Field of Search ............... 198/502.1, 502.4, 718

[56] References Cited
U.S. PATENT DOCUMENTS

| | | | |
|---|---|---|---|
| 4,809,576 | 3/1989 | Bakermans et al. | 198/502.1 X |
| 4,914,964 | 4/1990 | Speiser | 198/502.1 X |
| 5,011,359 | 4/1991 | McDonald | 198/502.1 X |
| 5,079,729 | 1/1992 | Nowakowski | 198/502.1 X |

Primary Examiner—James R. Bidwell
Attorney, Agent, or Firm—Ronald C. Kamp; R. B. Megley

[57] ABSTRACT

A travel monitor for a rectangular sludge conveyor having a plurality of scrapers attached to and driven by a pair of chains, each of which is formed in a closed loop having an upper run. A pair of detector sprockets independently engage and are driven by the upper runs. Switches positioned adjacent the sprockets create a series of pulses in response to their rotation. The phase difference between the series of pulses resulting from rotation of the sprockets is detected, and a misalignment alarm is activated when the phase difference exceeds a predetermined amount.

5 Claims, 3 Drawing Sheets

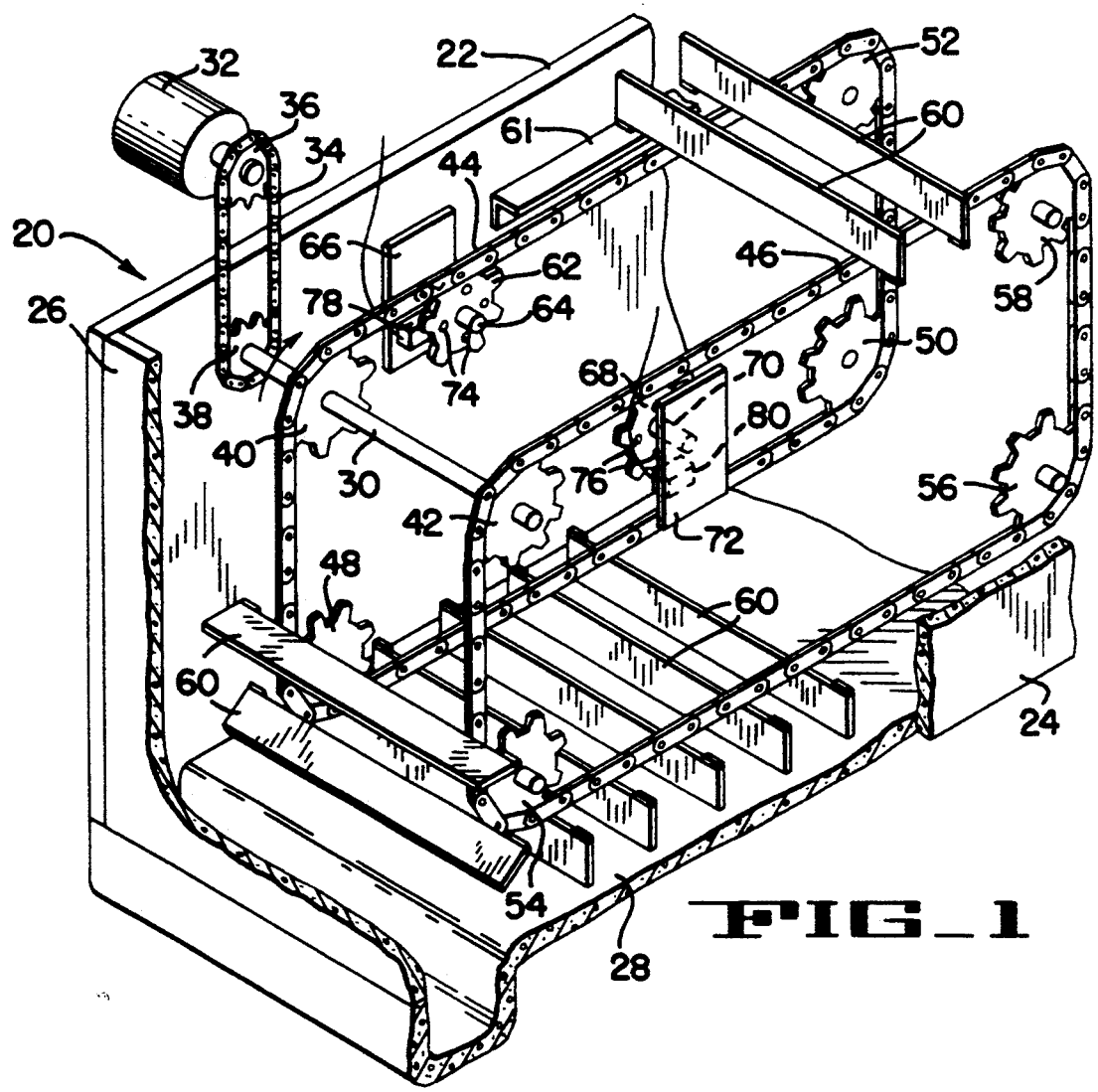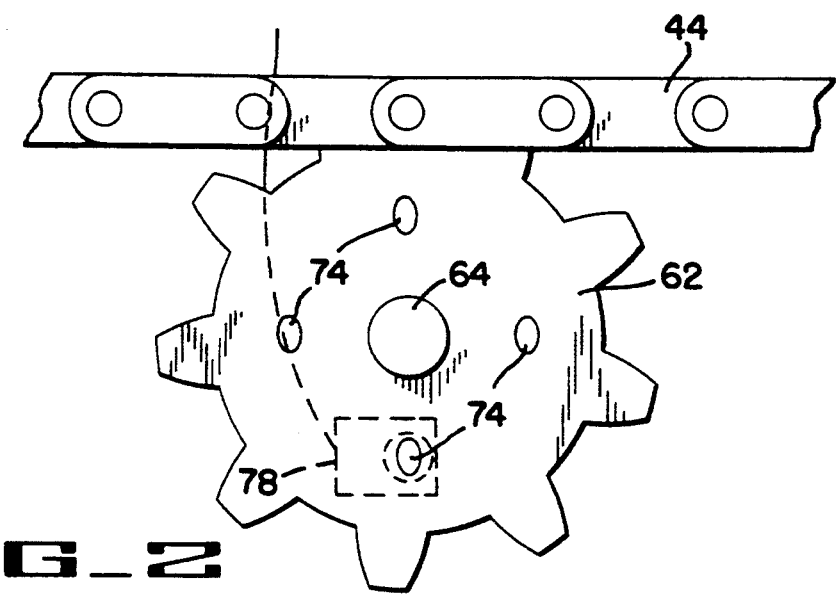

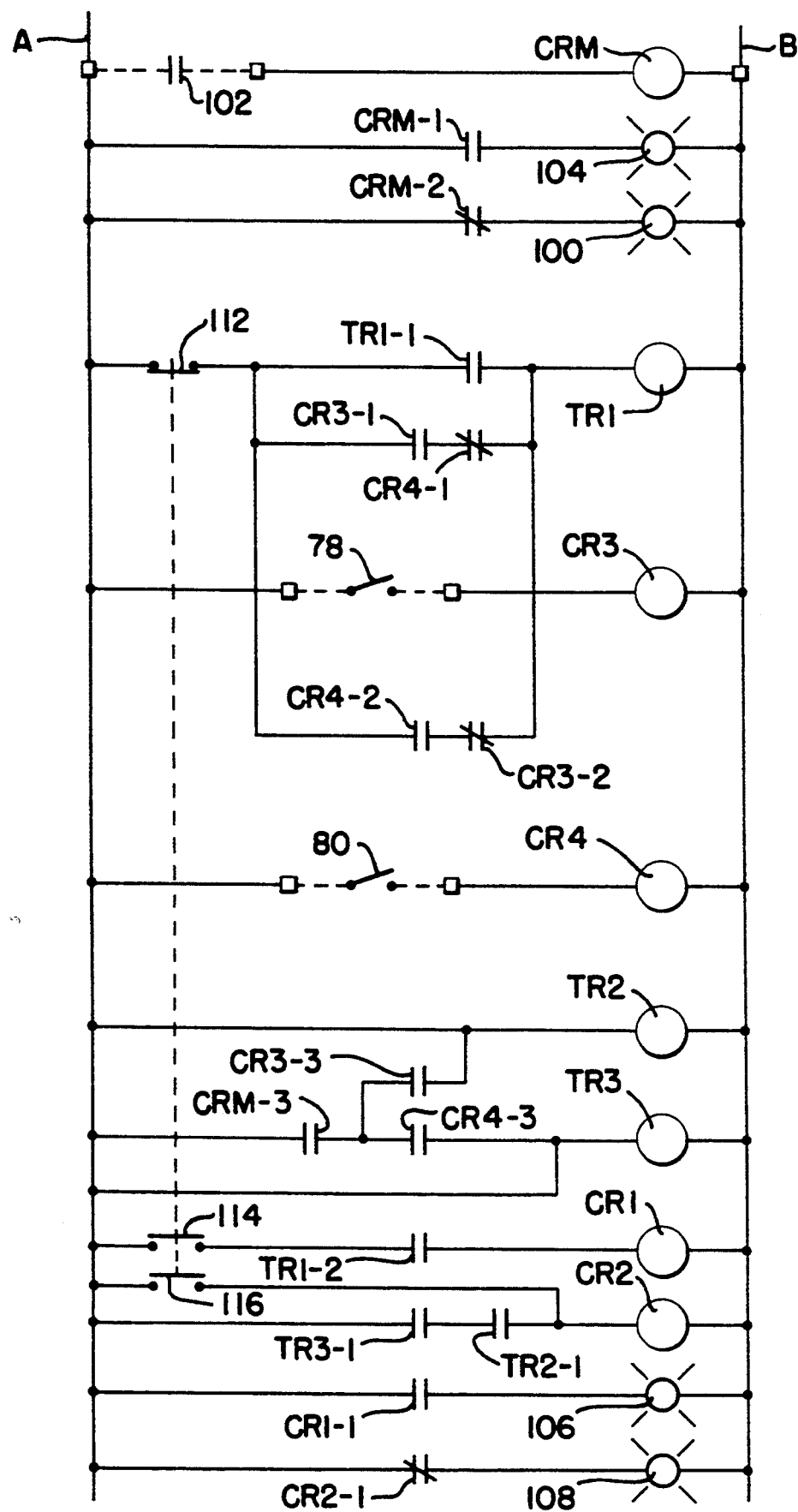
FIG_3

FIG_4
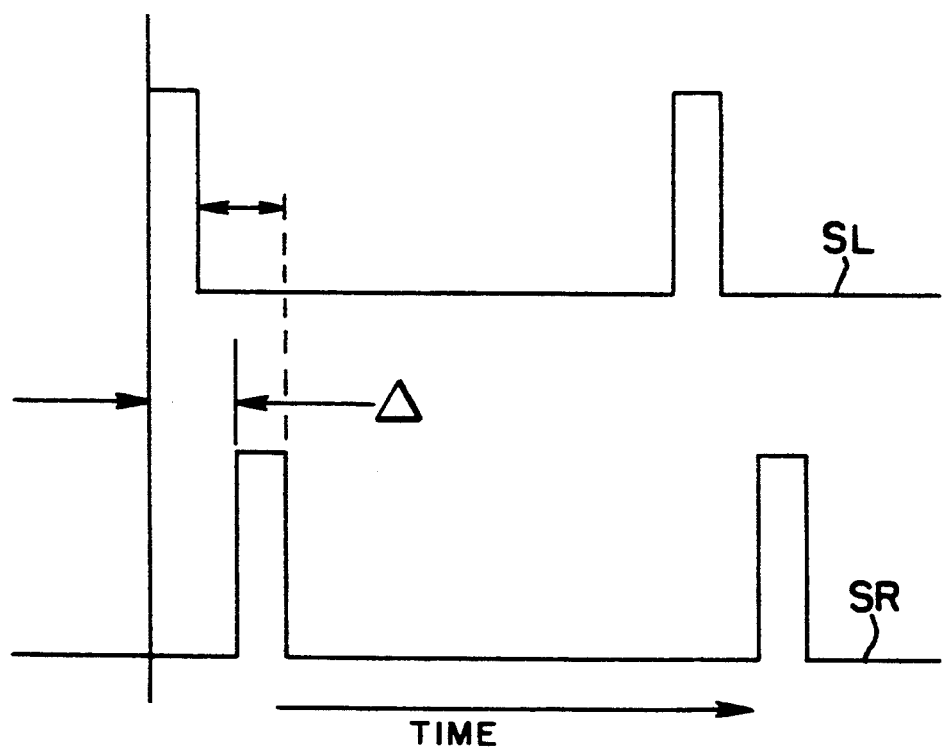
FIG_5
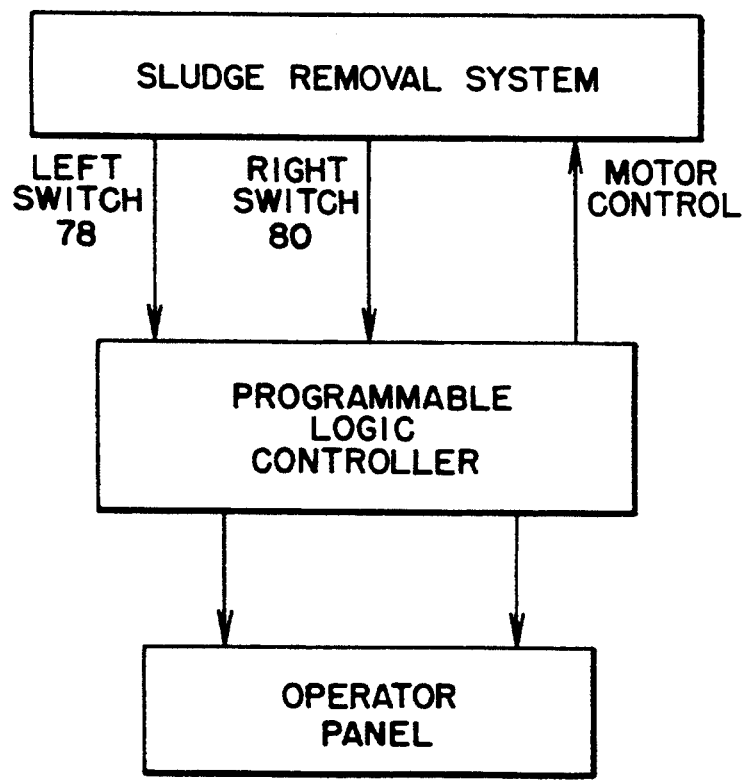

ALIGNMENT MONITOR AND METHOD

This invention relates to methods and apparatus for monitoring the operation of rectangular sludge conveyors, and more particularly to such methods and apparatus capable of detecting malfunctions therein.

Rectangular sludge conveyors are commonly used to remove solids from liquid flows in water treatment or sewage treatment plants. Lighter solids will separate from the flow and rise to the top of the liquid surface and the heavier solids will settle out across the bottom of the settling tanks as sludge. Such conveyors utilize a plurality of scrapers or flights connected to and driven by a pair of endless chains. Typical installations range dramatically in size, from 6' wide to 30' wide and 12' long to 300' long with perpendicular scraping members spanning the width, driven by endless conveyor chains. Generally, the scrapers are spaced 5 to 20 feet apart and attached to chains via attachment members. The conveyors are generally driven at speeds ranging from 0.5 to 6 feet per minute. The primary function of the scrapers in the sludge conveyors is to move the sludge that accumulates on the bottom of the settling tank toward one end of the tank to permit removal of the sludge. The scrapers are normally oriented transverse to their direction of travel along the bottom and the top of the tank. Since the sludge itself does not form a layer of uniform density and thickness on the bottom of the tank, resistance of movement of the flights is not uniform along their length. Thus, one end of the flights could encounter greater resistance than the other. This non-uniformity of resistance is experienced also on the top of the tank where the scrapers ride on members called return runs. When the difference in the forces acting on the scrapers, and hence on the endless chains, becomes great enough, the scrapers can become misaligned, and if the forces are great enough, the endless chain(s) can break. Since these conveyors are operated in a submerged condition and in many cases it is difficult to visually observe the endless chains and the scrapers, some means of detecting when the scrapers became misaligned or the endless chain malfunctions is highly desirable.

The present invention provides a method of and apparatus for monitoring the operation of a rectangular sludge conveyor in a settling tank which can detect when such operation deviates beyond a range of acceptable limits or tolerances, which can operate reliably in the hostile environment of a settling tank, which can be readily incorporated into existing settling tank installations without mechanical modification thereto, and which is relatively simple to install, operate and maintain. These and other attributes of the present invention, and many of the attendant advantages thereof, will become more readily apparent from a perusal of the following description of a preferred embodiment and the accompanying drawings, wherein:

FIG. 1 is a pictorial representation of a sludge removal system, with portions thereof broken away and eliminated for clarity, FIG. 2 is a side elevational view of one of the detector sprockets;

FIG. 3 is a ladder type diagram of an electrical circuit associated with the present invention;

FIG. 4 is a graphic representation of the electric pulses generated by the circuit shown in FIG. 3; and FIG. 5 is a block diagram of one arrangement for a sludge removal system into which the present invention is incorporated.

Referring now to FIG. 1, there is shown a settling tank 20 formed by four walls, three of which are shown at 22, 24 and 26, joining with a bottom wall or floor 28. A drive shaft 30 extends between and is rotatably supported in the opposite side walls 22 and 24. The drive shaft 30 is rotated by an electric motor and gear reduction unit 32 by means of a driving chain 34 trained around a sprocket 36 keyed or otherwise attached to the shaft of gear reduction unit 32, and a sprocket 38 attached to the drive shaft 30. A pair of driving sprockets, which for convenience may be referred to as left sprocket 40 and right sprocket 42, are affixed to the drive shaft 30 with left and right chains 44 and 46 engaging the teeth of left and right sprockets 40 and 42 respectively. The left chain 44 is also trained over and engages sprockets 48, 50 and 52, each of which is rotatably mounted on shafts extending from and secured to the side walls 22, to form an endless loop. Similarly, the right chain 46 also forms an endless loop by being trained over and engaging sprockets 54, 56 and 58 rotatably mounted on shafts secured to the side wall 24. A plurality of scrapers 60 are secured to the chains 44 and 46 and extend substantially across the width of the tank 20 between the side walls 22 and 24, but do not contact the side walls. Since the chains 46 and 44 will sag, i.e., tend to form a catenary, in their lower horizontal runs, rails (not shown) are embedded in the bottom wall 28 which are engaged by wear strips on the scrapers 60. The sag of the upper horizontal runs of the chains 44 and 46 may be reduced by securing angles, such as the one shown at 61, to the side walls 22 and 24 to project outwardly from the inner surfaces thereof and support the scrapers 60. The scrapers 60 are oriented to be generally perpendicular to the side walls 22 and 24 in order to efficiently move the sludge collecting on the bottom wall 28 toward one end thereof where it is deposited in a sump formed in the tank for removal therefrom in a conventional manner. In order for the flights 60 to remain in their proper orientation the chains 44 and 46 must move in a uniform or synchronous manner. If the forces on the chains are sufficiently uneven, it is possible for one endless chain to slip over a tooth on its associated drive sprocket, i.e., either sprocket 40 or 42. While slipping only one tooth is generally tolerable, because the resulting deviation from the desired 90 degree angle between the scrapers 60 and the side walls 22 and 24 is slight, continued slippage and/or greater tension on one endless chain may cause additional slippage of the same chain. The resulting greater angular deviation of the scrapers is not tolerable. When the scrapers become severely angled, excessive loading is applied directly to the scraper, the scraper attachment, the endless chain and eventually the conveying sprockets. The excessive loading may exceed the working strength of any of these components and result in an overload condition sufficient to permanently damage or break the conveyor components. The scrapers will also tend to become distorted and/or twisted with non-metallic systems prohibiting proper operation and movement. Overloading of these conveyor systems has become increasingly less tolerable with the more recently developed non-metallic component systems, which cannot tolerate elevated loadings or misalignment as well as traditional metallic component systems with normally higher strengths.

In order to monitor the operation of the rectangular sludge conveyor, a detector sprocket 62 is mounted on a stub shaft 64 secured to a plate 66 embedded in or otherwise secured to the side wall 22. The sprocket 62 is maintained on the shaft 64 so it is in line with and engaging the lower side of the upper run of the left chain 44. A similar detector sprocket 68 is rotatably mounted on a stub shaft 70 secured to a plate 72 embedded in or otherwise secured to the wall 24 opposite the sprocket 62. The detector sprocket 68 is also retained to be positioned in line with and engaging the lower side of the upper run of the right chain 46. The detector sprockets 62 and 68 are independently rotated by the movement of the respective chains 44 and 46. A plurality of sensing targets 74 and 76, equally angular spaced, is embedded in or otherwise attached to the sprockets 62 and 68, respectively. Proximity switches 78 and 80 are secured to the plates 66 and 72 respectively and positioned thereon to be closed by the sensing targets 74 and 76 which may, for example, be magnets. The switches 78 and 80 will produce an electrical output pulse, the duration or width of which is a function of the angular width of the sensing targets and the speed of rotation of the associated sprocket. Although at the speeds the sprockets are driven by the chains, the influences of speed on the pulse width is relatively minor. The output pulses from the proximity switches 78 and 80 will occur at the same point in time if the sprockets are initially oriented so the sensing targets are identically positioned and rotate at the same uniform rotational speed. The rotation of the detector sprockets 62 and 68 is determined entirely by the movement of the chains 44 and 46 respectively. If the detector sprockets are initially oriented so the sensing targets are identically positioned as related to the proximity switch, there will be a difference in the time at which the proximity switches 78 and 80 are actuated only if one sprocket is out of synchronization with the other, as would occur when one of the chains slips on its associated drive sprockets 40 or 42. When that occurs, a phase difference or shift will be created, as shown at $\Delta$ in FIG. 4. If the left proximity switch 78 is regarded as the reference and produces a series of pulses by the reaction of the switch to the passing magnets, the resulting pulses are represented by the line SL. A lagging right chain 46 will produce a stream of pulses represented by the line SR, the phase shift or difference being $\Delta$.

A scraper misalignment monitor is incorporated into the circuit of FIG. 3 to monitor the operation of the rectangular sludge conveyor and provide a warning when that operation is outside of predetermined acceptable limits. In the convention for ladder-type circuit diagrams, line A may be regarded at being a supply voltage and line B as neutral so that completion of a connection between lines A and B will energize the component or components in that portion of the circuit. An "OFF" indicator light 100 is energized by normally closed switch CRM-2 when the conveyor itself is in an "OFF" or de-energized state. When the conveyor is started, the normally open switch 102 is closed, energizing the control relay CRM. When control relay CRM is energized, the normally open switch CRM-1 is closed, which energized the "ON" indicator light 104, and the normally closed switch CRM-2 is opened causing the light 100 to be de-energized. Starting the conveyor also energizes the motor 32 which then drives the chains 44 and 46 causing the detector sprockets 62 and 68 to rotate. As the detector sprockets 62 and 68 rotate, the proximity switches 78 and 80 will each produce a series of pulses as a result of the passing sensing targets. A pulse from switch 78 will energize control relay CR3 which will close normally open switch CR3-1. Since switch CR3-1 is connected in series with normally closed switch CR4-1, the timer TR1 will be actuated and will continue to time even though switch CR3-1 has returned to its normally open state. Timer TR1 is set to time out after a predetermined time interval, e.g., 2–15 seconds, which is a direct measure of the acceptable phase differential $\Delta$, and will close normally open switches TR1-1 and TR1-2 if not restarted by another pulse before the lapse of the predetermine time interval. When timer TR1 has timed out, switch TR1-1 holds that state while TR1-2, being also closed, energizes the control relay CR1 closing switch CR1-1 and energizing an alarm 106. However, a pulse generated by the closing of proximity switch 80 will energize control relay CR4 which will close the normally open switch CR4-2. Since CR4-2 and normally closed switch CR3-2 are connected in series, the pulse from proximity switch 80 will restart the timer TR1, but only if the pulse reaches the timer TR1 before it has timed out. If the pulses from the two proximity switches 78 and 80 overlap, i.e., control relay CR3 is still energized when CR4 is energized, the opening of normally closed switch CR4-1 by control relay CR4 will chop off the remaining portion of the pulse from the proximity switch 78 while the still energized control relay CR3 will be holding switch CR3-2 open. The timer TR1 will, therefore, receive two discrete pulses separated by the amount of overlap of the two pulses from the proximity switches 78 and 80.

A loss of motion monitor is also incorporated into the circuit of FIG. 3. A timer TR2, which begins timing upon being de-energized, is set for a longer period of time than TR1, e.g., 2–15 minutes, and begins timing when the switch CR3-3 opens as occurs when control relay CR3 is de-energized. A timer TR3, which begins timing upon being de-energized, is set for time similar to TR2 and begins timing when the switch CR4-3 opens as occurs when control relay CR4 is de-energized. Switches TR3-1 and TR2-1 are connected in series with control relay CR2, which when energized opens normally closed switch CR2-1. The switch CR2-1 is connected to and controls a loss of motion alarm 108. The alarm 108 is activated when control relay CR2 is de-energized thereby permitting the switch CR2-1 to return to its normally closed position. The control relay CR2 will be de-energized whenever either of the switches TR2-1 or TR3-1 opens, which will occur if the associated timers TR2 and TR3 are not restarted by the decay of a pulse created by the switches 78 and 80 before the timers have timed out. The timers TR2 and TR3 will time out the detector sprockets 62 and 68 associated therewith are not being rotated by the chains 44 and 46 respectively. Thus, the alarm will be activated in the event either or both of the detector sprockets 62 and 68 are not rotating, thus indicating a loss of motion.

In order to initially synchronize the two sprockets 62 and 68, one of the chains 44 and 46 is manually lifted so that the sprocket engaging the lifted chain may be manually rotated to a position in which the sensing targets correspond to those on the other sprocket. To preclude false alarms during this procedure, the normally closed switch 112 is moved to an open position which disables the timer TR1. Normally closed switch 114 and normally open switch 116 are connected to be respectively opened and closed with the opening of switch 112. The opening of the switch 114 insures that control relay CR1 remains de-energized, which in turn insures that switch CR1-1 is open thereby precluding actuation of misalignment alarm 106. The closing of switch 116 insures that control relay CR2 is energized, which in turn maintains switch CR2-1 in an open position thereby precluding actuation of the loss of motion alarm 108.

In the arrangement shown in FIG. 5 a programmable logic controller (PLC) is essentially substituted for the circuit shown in FIG. 3. In this arrangement one of the detector sprockets 62 and 68 is select as the master and the other of these sprockets is then synchronized with respect to the master. This is achieved in a manner similar to that described earlier, i.e., one of the chains 44 and 46 is raised to permit rotation of the slave sprocket to be rotated to be in synchrony with the master sprocket. The system is then operated for a specified period of time under normal operating conditions with the PLC recording the history of such operation. Based on this history the PLC then develops a reference set point and establishes acceptable limits based on a predetermined algorithm, such as averaging, to avoid nuisance alarms and sets the limits for catastrophic malfunction, such as chain breakage. The PLC then monitors subsequent operation and activates an alarm similar to alarm 106 when the acceptable limits are exceeded and activates a separate loss of motion alarm similar to alarm 108 when a catastrophic malfunction is detected. The PLC may, if desired, be provided with the capability of de-energizing the electric motor 32 when a catastrophic malfunction is detected in addition to activating an alarm indicating the presence of such a malfunction.

While preferred embodiments of the present invention have been illustrated and described herein, it is to be understood that various changes may be made therein without departing from the spirit of the invention as defined by the scope of the appended claims.

What is claimed is:

1. A travel monitor for a rectangular sludge conveyor having a plurality of scrapers attached to and driven by a pair of chains, each of which is formed in a closed loop having an upper run; said monitor comprising:
    a pair of detector sprockets independently engaging and driven by said chains;
    means for creating a series of pulses in response to the rotation of each of said pair of sprockets;
    means for detecting the phase difference between said series of pulses; and
    means for energizing a first misalignment alarm when said phase difference exceeds a predetermined amount.

2. The invention according to claim 1 and further comprising:
    means for activating a second loss of motion alarm when at least one of said sprockets stop rotating.

3. In a rectangular sludge conveyor for a sludge removal system having a plurality of scrapers connected to and driven by left and right endless chains, each of which is formed in a closed loop defining an upper and lower run; an improved travel position monitor comprising:
    left and right detector sprockets engaging and rotated by said left and right endless chains respectively;
    left and right sensing means independently responsive to the rotation of the left and right sprockets respectively;
    means for activating a first alarm when said sensing means indicates that said flights are misaligned; and
    means for activating a second alarm when said sensing means indicates at least one of said sprockets has not rotated within a predetermined time period.

4. The invention according to claim 3 wherein said sludge removal system comprises an existing installation having a tank with opposing side walls and said sprockets are mounted on said walls thereof adjacent said upper runs, said mounting of said sprockets to said walls being the only mechanical change required to retrofit said existing installation.

5. A method of monitoring the operation of a sludge removal system having a plurality of scrapers driven by a pair of endless chains comprising the steps of:
    providing first and second independently rotatable detector sprockets engageable by each of said pair of endless chains;
    temporarily disengaging one of said sprockets from engagement with its associated chain and rotating said one sprocket so that it is synchronized with the other of said sprockets;
    operating said system for a predetermined period of time while collecting data thereon;
    developing limits of acceptable operation based on the collected data; and
    activating an alarm when subsequent operation exceeds said developed limits.

* * * * *